(12) United States Patent
Farmer et al.

(10) Patent No.: US 6,254,170 B1
(45) Date of Patent: Jul. 3, 2001

(54) VEHICLE DOOR PROTECTIVE DEVICE

(76) Inventors: Barry Farmer; Eva Farmer, both of 94 Clym St., Providence, RI (US) 02908

( * ) Notice: Subject to any disclaimer, the term of this patent is extended or adjusted under 35 U.S.C. 154(b) by 0 days.

(21) Appl. No.: 09/519,268

(22) Filed: Mar. 7, 2000

(51) Int. Cl.$^7$ .................................................. B60J 7/20
(52) U.S. Cl. .......................... 296/136; 296/128; 150/166; 280/770
(58) Field of Search ................... 296/128, 136; 150/166; 280/770

(56) References Cited

U.S. PATENT DOCUMENTS

| | | |
|---|---|---|
| D. 339,784 | 9/1993 | Reid et al. . |
| 1,728,437 * | 9/1929 | Mott ..................... 296/128 |
| 2,326,713 * | 8/1943 | Wesseler ................. 89/36 |
| 4,041,999 * | 8/1977 | Miller .................... 296/136 |
| 4,531,560 * | 7/1985 | Balanky .................. 296/136 |
| 4,635,996 * | 1/1987 | Horose ................... 296/136 |
| 4,639,027 * | 1/1987 | Boyd ..................... 296/136 |
| 4,708,380 | 11/1987 | Cruz . |
| 4,810,013 * | 3/1989 | Spears ................... 280/770 |
| 4,810,015 * | 3/1989 | McNeil ................... 296/136 |
| 4,828,302 | 5/1989 | Marasigan, Jr. . |
| 4,951,993 * | 8/1990 | Taboada .................. 296/136 |
| 4,997,229 * | 3/1991 | Swanson .................. 296/136 |
| 5,129,695 * | 7/1992 | Norman, II ............... 280/770 |
| 5,149,166 | 9/1992 | Wille et al. . |
| 5,209,545 * | 5/1993 | Slaugh ................... 296/136 |
| 5,605,369 * | 2/1997 | Ruiz ..................... 296/136 |
| 5,738,403 * | 4/1998 | Tyson .................... 296/136 |
| 5,927,793 * | 7/1999 | McGrath .................. 296/136 |
| 5,984,401 * | 11/1999 | Hannah ................... 296/136 |
| 6,017,079 * | 1/2000 | Warner ................... 296/136 |

* cited by examiner

*Primary Examiner*—Joseph D. Pape
*Assistant Examiner*—Kiran B. Patel
(74) *Attorney, Agent, or Firm*—Henderson & Sturm LLP

(57) ABSTRACT

A vehicle door protector that includes a flat sheet of flexible material that is disposed to substantially overlie the entire exterior surface of the lower portion of the door. The flat sheet is constructed from vinyl and an underlying foam rubber sheet to provide a tough exterior surface and a cushion for articles that may impact the door and cause damage. A flap opening is provided in the flat sheet in registry with the door handle. A number of straps extend from the vertical edges of the flat sheet around the front and rear door edge surfaces and across the interior surface of the door. A connecting ring receives and secures the strap ends in contact with the interior door surface. Decorative notches may be formed near the vertical edges of the door to provide a sporty accent.

5 Claims, 2 Drawing Sheets

VEHICLE DOOR PROTECTIVE DEVICE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of vehicle accessories, and more particularly to a vehicle door protective device.

2. Description of Related Art

As can be seen by reference to the following U.S. Pat. Nos. D339,784; 4,708,380; 4,828,302 and 5,149,166 the prior art is replete with myriad and diverse vehicle door protectors.

While all of the aforementioned prior art constructions are more than adequate for the basic purpose and function for which they have been specifically designed, they are uniformly deficient with respect to their failure to provide a simple, efficient, and practical vehicle door protective device that protects substantially the entire exterior door surface.

As a consequence of the foregoing situation, there has existed a longstanding need for a new and improved vehicle door protective device and the provision of such a construction is a stated objective of the present invention.

BRIEF SUMMARY OF THE INVENTION

Briefly stated, the present invention provides a vehicle door protector that includes a flat sheet of flexible material that is disposed to substantially overlie the entire exterior surface of the lower portion of the door. The flat sheet is constructed from vinyl and an underlying foam rubber sheet to provide a tough exterior surface and a cushion for articles that may impact the door and cause damage. A flap opening is provided in the flat sheet in registry with the door handle. A number of straps extend from the vertical edges of the flat sheet around the front and rear door edge surfaces and across the interior surface of the door. A connecting ring receives and secures the strap ends in contact with the interior door surface. Decorative notches may be formed near the vertical edges of the door to provide a sporty accent.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
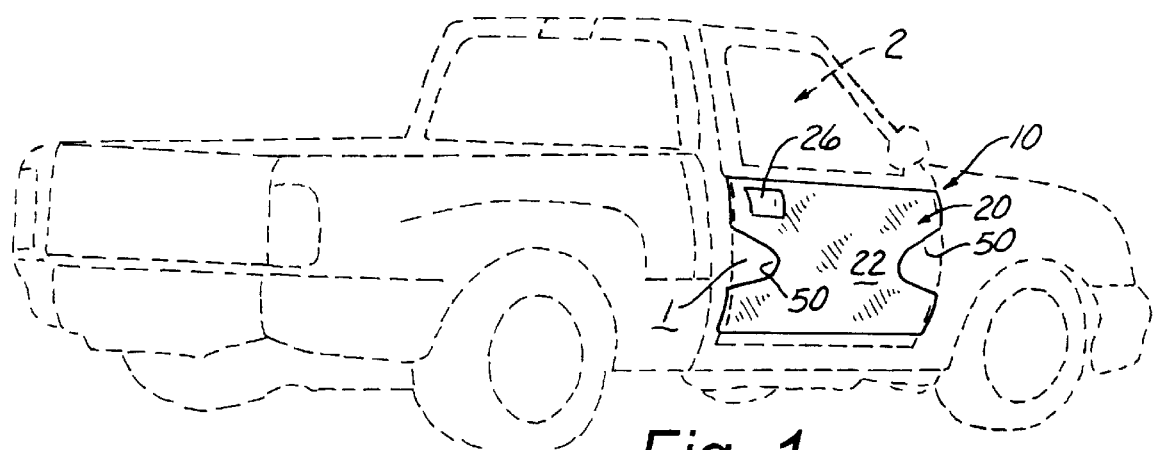
FIG. 1 is a perspective view of the vehicle door protector of the present invention attached to the door of a pickup truck.
Figure 2:
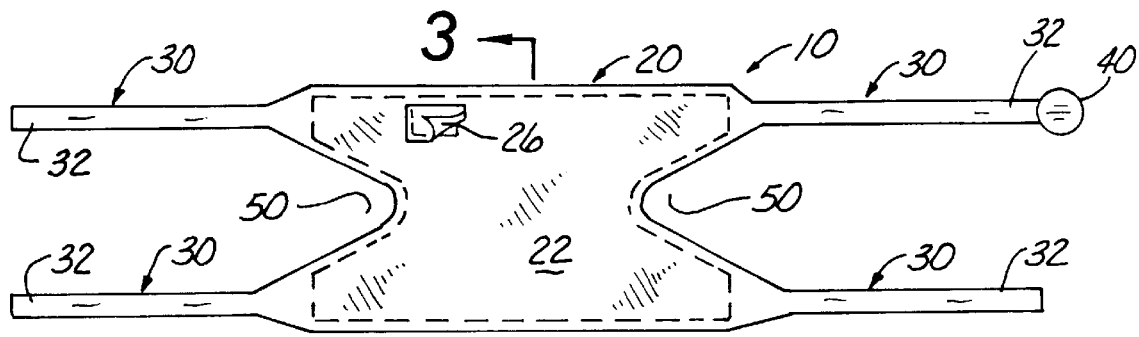
FIG. 2 is a front elevational view of the door protector in the uninstalled condition.
Figure 3:
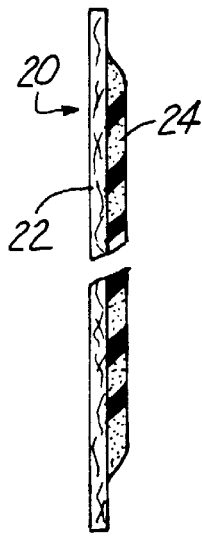
FIG. 3 is a broken away sectional view taken along line 3—3 of FIG. 2.
Figure 4:
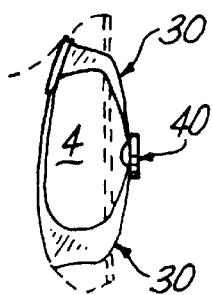
FIG. 4 is a partial perspective view showing the straps extending around the rear edge surface and across the interior surface of the vehicle door.
Figure 5:
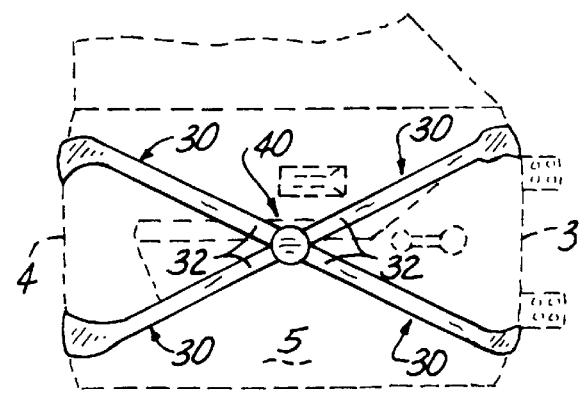
FIG. 5 is a rear elevational view showing the straps connected on the interior surface of the door.
Figure 6:
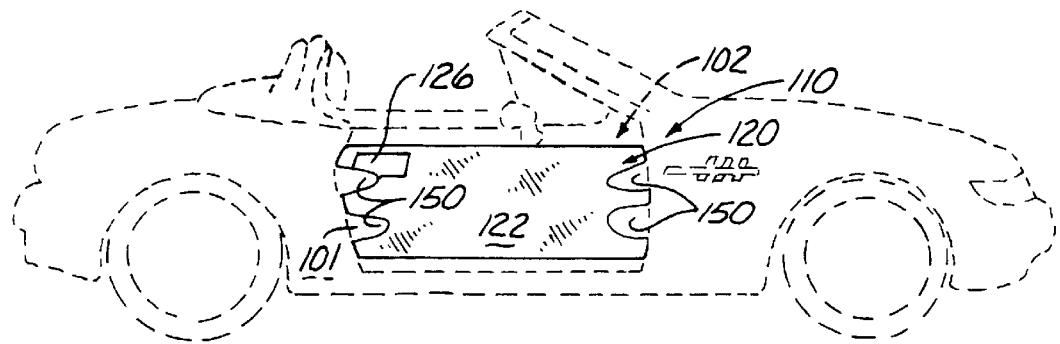
FIG. 6 is a perspective view of an alternate embodiment of the vehicle door protector attached to the door of a sports car.
Figure 7:
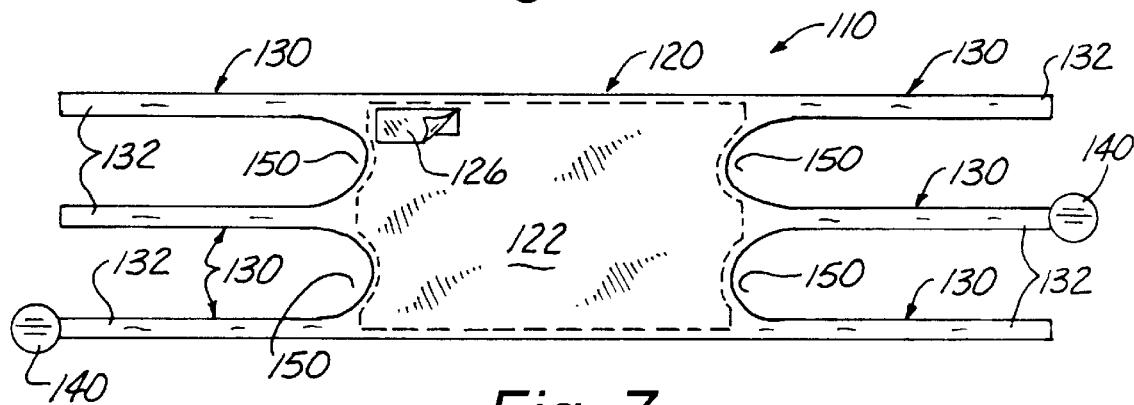
FIG. 7 is a front elevational view of the alternate embodiment.
Figure 8:
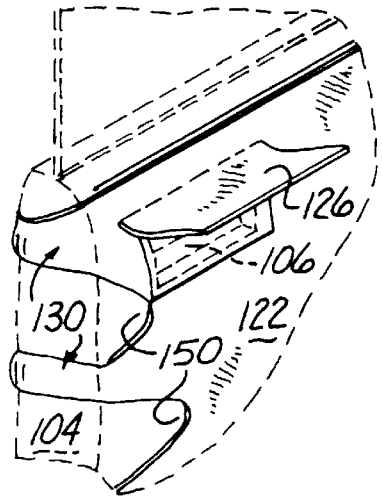
FIG. 8 is a partial perspective view showing the straps of the alternate embodiment extending around the rear edge surface of the door.
Figure 9:
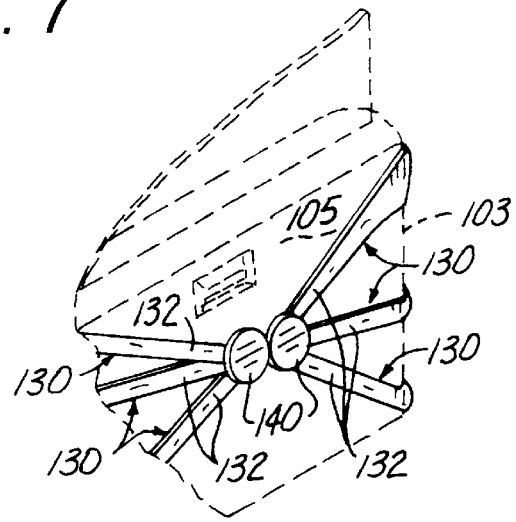
FIG. 9 is a partial perspective view showing the straps of the alternate embodiment attached at the interior surface of the door.

As can be seen by reference to the drawings, and in particularly to FIG. 1, the vehicle door protector that forms the basis of the present invention is designated generally by the reference number 10. The protector 10 includes a flat sheet 20 of flexible material that is disposed to substantially overlie the entire exterior surface 1 of the lower portion of the pickup truck door 2. The flat sheet 20 is formed of a sheet of vinyl 22 and an underlying attached sheet of foam rubber 24. A flap opening 26 is formed in the flat sheet 20 in registry with the door handle (not shown). Straps 30 are attached to the flat sheet 20 at the front and rear edges and the strap ends 32 extend around the door front and rear edges 3, 4 and across the interior door surface 5 where they are attached to and secured by a ring connector 40. Decorative notches 50 are formed between adjacent straps 30 at the front and rear edges of the flat sheet 20 to provide a sporty look.

FIGS. 6–9 show an alternate embodiment protective device 110 attached to substantially cover the exterior surface 101 of the lower portion of a sports car door 102. The flat sheet 120 is formed of a vinyl—foam rubber laminate or other suitable materials. A flap opening 126 is formed in the sheet 120 to provide access to the door handle 106. Straps 130 extend from the front and rear edges with ends 132 that extend around the front and rear door edge surfaces 103, 104 to the interior door surface 105 where the ends 132 are connected and secured by a pair of ring connectors 140. Decorative notches 150 are formed in the sheet 120 between adjacent straps 130 to provide a pleasing accent.

The vehicle door protector 10, 110 is an original automobile accessory which serves a twofold purpose. First, it functions as a protective barrier for a car door against scratches, dings and the like, enhancing the car's eventual resale value and sparing the owner the expense of these minor but expensive repairs. Secondly, it affords an eye grabbing, sporty accent to a sport car, a sport utility vehicle or a sport truck. Its visual effect is similar but superior to that of other auto accessories currently in vogue such as "Bras" and hood protectors; superior because the door protector 10, 110 is far more visible and is installed in pairs rather than as a single item. The device is an extremely thin, vinyl covered, cushioning pad which quickly attaches to a car door by means of straps. The straps are tied together on the inside of the vehicle and tightened onto two small, decorative, metal rings which are sewn onto the end of one of the straps.

The underlying pad is a thin, flexible sheet of foam, beveled at its edges, with a perimeter slightly smaller but proportional to the car door it is designed to be attached to. The vinyl covering extends the perimeter of the device nearly to the horizontal edges of the car door, and terminates in bands or straps of one construction with the sheets of vinyl near the vertical edges of the car door. The plane of the pad visible to the onlooker exactly matches the contour of the door of the car that it covers. Finally, the pad is equipped with a small flap which is cut and molded onto its face, which rests on the handle of the car door and which is lifted with the handle when the door is opened.

The stylistic effect of the door protector 10, 110 varies according to the material chosen for is construction, to the particular pattern of the stitch adopted to secure the vinyl to the foam, and to the shape of the car door that wears it. The seams are multiply reinforced and contribute to its complexion and to the appearance of a quality construction.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A vehicle door protective device for use out a vehicle door having an upper window portion, a lower portion including an exterior surface with horizontal and vertical edges defining a perimeter and a door handle disposed on the exterior surface, an interior surface, and front and rear edge surfaces interconnecting the exterior and interior surfaces, the vehicle door protective device comprising:

a flat sheet of flexible material disposed to substantially overlie the entire exterior surface of the lower portion of the door;

a flap opening formed in the flat sheet and being disposed in registry with the door handle;

a plurality of horizontally disposed straps attached to and extending from front and rear edges of the flat sheet and having ends disposed to extend around the front and rear edge surfaces and across the interior surface of the door; and a ring connector attached to one of the ends of the straps and disposed in contact with the interior surface of the door, the ring connector being disposed to recieve and secure the other of the ends of the straps.

2. The vehicle door protective device of claim 1 wherein the flat sheet of flexible material includes a sheet of vinyl and an underlying attached sheet of foam rubber.

3. The vehicle door protective device of claim 1 wherein the flat sheet includes decorative notches formed between adjacent straps.

4. The vehicle door protective device of claim 3 wherein one notch is formed at front and rear edges of the flat sheet.

5. The vehicle door protective device of claim 3 wherein the notches are formed at front and rear edges of the flat sheet.

* * * * *